No. 841,612. PATENTED JAN. 15, 1907.
H. ANSCHÜTZ-KAEMPFE.
SUSPENSION OF ROTATING APPARATUS AND MAGNETIC COMPASSES.
APPLICATION FILED OCT. 16, 1905.

Witnesses:
John O. Seifert
Robert Ade

Inventor:
Hermann Anschütz-Kaempfe,
By his Attorney,
F. H. Richards

UNITED STATES PATENT OFFICE.

HERMANN ANSCHÜTZ-KAEMPFE, OF KIEL, GERMANY.

SUSPENSION OF ROTATING APPARATUS AND MAGNETIC COMPASSES.

No. 841,612.     Specification of Letters Patent.     Patented Jan. 15, 1907.

Application filed October 16, 1905. Serial No. 283,061.

*To all whom it may concern:*

Be it known that I, HERMANN ANSCHÜTZ-KAEMPFE, doctor of philosophy, a subject of the German Emperor, residing in Kiel, in the Kingdom of Prussia, Germany, have invented certain new and useful Improvements in Suspension of Rotating Apparatus and Magnetic Compasses, of which the following is a specification.

The suspension of a gyroscope on fixed support must be effected in such manner that the horizontal turning of the support relatively to the rotating masses should take place with the least friction possible. To that end it has been proposed to suspend the gyroscope from a floating body or to support it on such a body. The buoyancy of the floating body then relieves the pressure on the bearings about which the horizontal rotation takes place, so that the said rotation produces very little friction. The arrangement of this floating suspension offers, however, in many cases practical difficulties which considerably increase the cost of the apparatus. It has therefore appeared desirable to provide an arrangement for neutralizing the vertical pressure on the bearing about which the horizontal rotation of the system takes place without the use of floating suspension. Such an arrangement forms the subject of this invention.

According to this invention the injurious influence of the said pressure is done away with by communicating a constant rocking movement about the vertical axis to the bearing on which the system is resting and relatively to which the horizontal turning takes place. Owing to this arrangement the friction due to the bearing being fixed is also removed, and thus the resistance which the friction offers to the horizontal rotation of the system is considerably reduced.

In the accompanying drawings is shown a construction according to this invention, and wherein—

Figure 1:
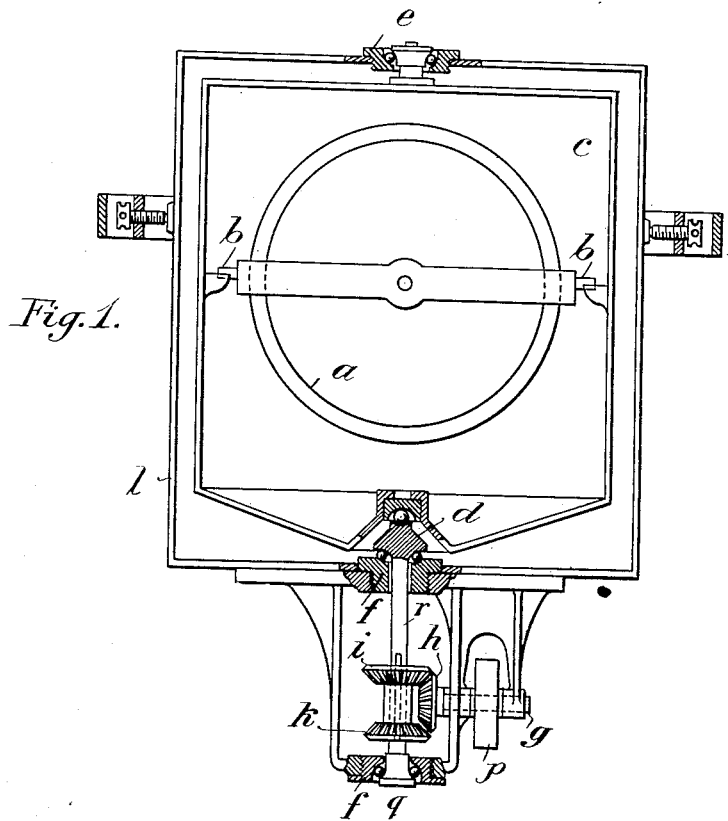
Figure 2:
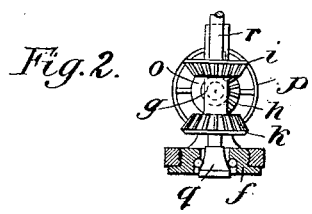

Figure 1 is a side elevation, some parts being shown in central section; and Fig. 2 is a detail of the driving-train at about right angles to the position of these parts in Fig. 1.

The rotating mass of a gyroscope (shown diagrammatically) is indicated by $a$. This mass is supported by means of knife-edges $b$ in a cap $c$, which rests on a cone $d$, and at the top is the bearing $e$ for steadying the cap against lateral movement.

According to former suggestions for the construction of a gyroscope, the cap $c$ would have been made into a floating body—that is to say, arranged in a second vessel containing some suitable liquid. Instead of that arrangement and in accordance with this invention the cone $d$ is caused to rock about its vertical axis. In the construction illustrated the cone $d$ is carried by a shaft $r$, supported in bearings $f$ and driving it from a uniformly-rotating spindle $g$ by means of a gear $h\ i\ k$ now in one and then in the opposite direction about its vertical axis. The thrust from the gearing upon the lower end of the shaft $r$ is received by a cone $q$ in the bearing $f$.

Some suitable arrangement of gears may be used for turning the cap $c$ first in one direction and then in the other. In the construction illustrated the movement in both directions will be equal and, in its present showing, about one hundred and eighty degrees in each direction. A slowly-rotating toothed wheel $h$ may be driven from some suitable source of power (not shown) through a pulley $p$, which affords the power in the present illustration. The reversal of the direction of rotation of the cone $d$ is effected each time after the toothed wheel $h$ has completed half a revolution. In order that reversal may take place without shocks, the toothed wheel $h$ is a mutilated gear, it being provided with teeth on only one half of its circumference, and the other side, as at $o_x$, is free of teeth. It thus drives the wheel $i$ until the toothed portion of the circumference comes to an end, and then the wheel $k$ is driven. The latter is driven again as long as the toothed portion of $h$ is in engagement with it. The cone is then rotating in the direction opposite to that of its former movement.

The frame, which is provided with the upper bearing $e$ for the cap $c$ and the bearings for the cone and for the driving-spindle of the gear, is suspended in the usual manner by means of a universal joint.

The working of the device will be readily understood. When the support on which the apparatus is placed—for instance, a ship—turns slowly, this turning is added to the rotation of the cone. As regards the rotating masses the rotation of the cone will be accelerated in one direction and retarded in the other.

The "fixed" friction between the system and its bearing—that is to say, the cone—is thus removed. The friction to be overcome during the horizontal rotation of the system is therefore reduced to a considerable extent compared to an arrangement in which the pin is fixed. It is obvious that this arrangement is not limited to those constructions in which the rotating mass or the cap carrying it is supported by a cone. The invention can be just as well applied to arrangements in which the whole system is supported by ordinary pins.

It must be pointed out that the arrangement could be usefully employed for magnetic compasses, in which the conditions are similar to those obtaining in a gyroscope.

Having now particularly described and ascertained the nature of my said invention and in what manner the same is to be performed, I declare that what I claim is—

1. The combination with a suspension device for rotary compasses comprising a supporting-bearing, of means for rocking the bearing about a vertical axis by a series of equal excursions and recessions.

2. The combination with a gyroscope system, of a bearing for supporting the same and rotatably supported in its axial direction, and occupying a position in axial coincidence with one of the axes of said system, and a train of gears for oscillating said bearing.

3. The combination with the frame of a gyroscope system, of a bearing member on which the frame is movable on a vertical axis, and means for oscillating such bearing member about said axis by a series of equal excursions and recessions.

4. The combination with the frame of a gyroscope system, of a bearing member on which the weight of the frame is supported and whereon it is movable about a vertical axis, and power-driven means for oscillating the bearing member about said axis by a series of equal excursions and recessions.

5. The combination of a supporting member, a vertical shaft mounted at the lower part of the member, a frame carrying a gyroscope and pivotally supported on the upper end of the said shaft, a bearing for laterally supporting the frame at the upper part of the supporting member, a pair of gears fast on said shaft, and a mutilated gear arranged for alternately engaging said gears when rotated for oscillating the shaft.

In witness whereof I have hereunto signed my name, this 27th day of September, 1905, in the presence of two subscribing witnesses.

HERMANN ANSCHÜTZ-KAEMPFE.

Witnesses:
JULIUS ROPKE,
OTTO LAU.